May 9, 1933. F. J. SPANG 1,908,072
MANUFACTURE OF WELDLESS ELEVATOR LINKS
Filed June 20, 1930
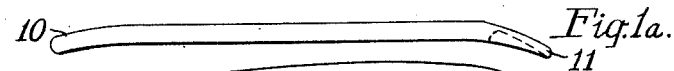
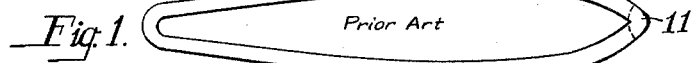
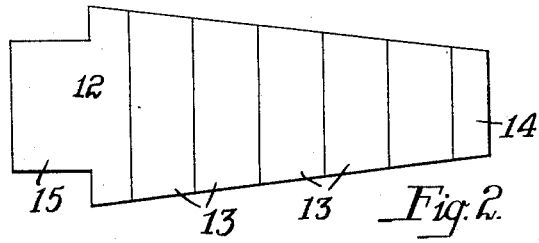
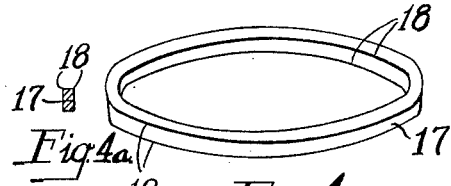
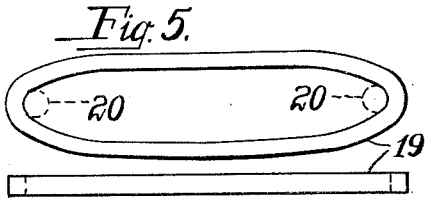
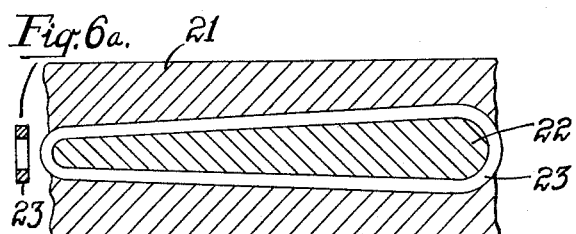
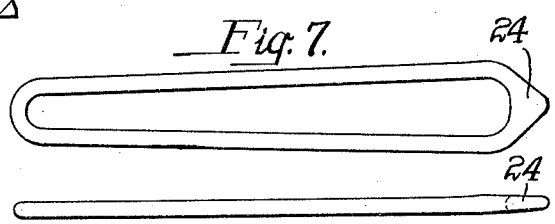
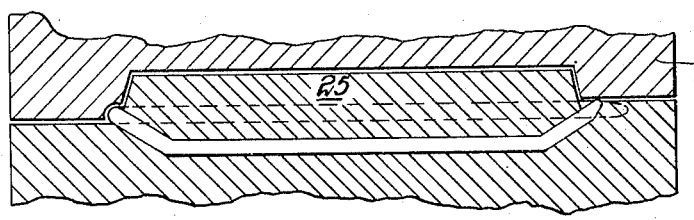
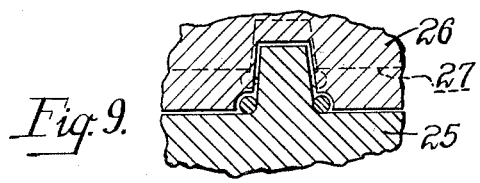
INVENTOR
Ferdinand J. Spang
By Green & McCallister
His Attorneys Patented May 9, 1933

1,908,072

UNITED STATES PATENT OFFICE

FERDINAND J. SPANG, OF BUTLER, PENNSYLVANIA

MANUFACTURE OF WELDLESS ELEVATOR LINKS

Application filed June 20, 1930. Serial No. 462,658.

This invention relates to the manufacture of weldless or seamless elevator links such as are used in oil well equipment for raising casing or the like from the well hole.

Elevator links have heretofore been made of bar iron or steel and the links have been formed by merely bending the same and welding the contacting portions together, usually at the top end. Such links have a definite hazard due to the uncertainty of the weld and it is clear that inasmuch as the links must be welded together the choice of material must be limited to those which can be so welded.

One of the objects of the present invention is to avoid any hazard due to the uncertainty of a weld.

Another feature of the invention is that by providing a weldless link non-weldable alloy steels can be used in the formation of the links.

Other and further objects and advantages will be understood by those skilled in this particular art.

In the accompanying drawing;

Figures 1 and 1a are views of prior art welded links.

Fig. 2 is a view of a steel ingot showing how it may be sliced into sections, which sections are utilized as blanks or starting pieces for the weldless links of the present invention.

Fig. 3 shows one of the sections of the ingot of Fig. 2 preliminarily upset and punched as shown in the dotted line form.

Figs. 4 and 4a show the next step wherein the upset and punched starting piece has been rolled into a ring of rectangular cross section.

Figs. 5 and 5a show the ring of Fig. 4 stretched into a semi-oval shape.

Figs. 6 and 6a show the semi-oval shape of Fig. 5 formed into a link.

Figs. 7, 7a and 7b show the link of Fig. 6 drop forged and having a circular cross section and a spacer tongue.

Fig. 8 shows the forged link of Fig. 7 shaped between dies or mandrels.

Fig. 9 shows a condensed fragmentary view of how the mandrels may operate, taken at right angles to Fig. 8.

Similar numerals refer to similar parts throughout the similar views.

Referring now in detail to the drawing:

Figure 1 shows an elevator link 10 of known type, having its top end welded as shown by the portion 11. This welded link is to be understood as being prior art and is merely shown in order that a comparison may be made between it and the link forming the subject matter of the present invention.

The first step according to the present invention is carried out by taking a steel ingot 12 of circular or polygonal cross-section or of any other form and slicing the same into sections 13 of desired or predetermined thickness, the slicing giving discarded pieces 14 and 15 of irregular shape depending upon the original contours of the steel ingot, but in some cases it will be appreciated that there may be no discards or that the discards will be very small. In any case, the discarded portions can be reworked and added to molten steel forming another ingot, thus preventing any waste. The showing of Fig. 2 is of course essentially diagrammatical and exemplary only.

Each section which has been sliced from the ingot from Fig. 2 is then upset and punched, passing from the shape shown in full lines in Fig. 3 to the shape shown in dotted lines and upon referring to Fig. 3 it will be seen that the section is lengthened and thinned when the size of the section 13 requires such and that a central hole 16 is punched centrally thereof.

The next step is to roll the upset and punched section of Fig. 3 into the ring 17 of Fig. 4 having a rectangular cross-section as shown by Figure 4—a to the left of Fig. 4. This ring, therefore, has sharp corners 18 and it will be appreciated that it is preferred not to have such in the final product for reasons which will be understood by one skilled in this art.

The succeeding step is shown in Fig. 5 and Fig. 5—a and results from stretching the ring 17 of Fig. 4 into a so-called semi-oval ring 19 which might be called perhaps elliptical, the points of stress due to their operation being indicated by the dotted line circles 20.

The next step is to form the semi-oval ring of Fig. 5 into the shape of a link 23 and this is done as shown in Fig. 6 by exerting pressure from the outside indicated graphically at 21 while the ring is retained around a central mandrel 22 and from referring to Figure 6—a at the left of Fig. 6, it will be noted that the cross-section of the link is still rectangular.

After the treatment of the link as shown in Fig 6, the link is now drop forged so that the cross-section is now round as shown in Fig. 7—a and so that a spacer tongue 24 is formed at the top thereof, that is, the portion which is at the top when the link is in actual use.

The drop forged link shown in Fig. 7 is now dropped over a mandrel 25 having a fixed length and pressure is exerted by a top die 26 on the link and spacer tongue to form them into the final shape shown in full lines in Fig. 8 in which they are actually used. The dotted lines of Fig. 8 show the link as and when first applied to the mandrel. This forming also acts to draw the link to its proper effective length.

Fig. 9 indicates how the operation of Fig. 8 appears in transverse view, the dotted line 27 being the "open" position of top die 26.

There is thus formed a unitary elevator link of correct size and proportions and of maximum strength so that the greatest advantages and efficiency in use may be secured. Not only are the above advantages secured but the further advantages reside in the fact that the link of the present invention may be made of some non-weldable alloy steel, such as so-called stainless or non-tarnishing steels which may not be weldable or regardless of welding characteristics. By taking the section of steel cross-wise of the billet and punching out the center thereof, I eliminate the weakest part of the steel as it is in this part that cavities, pipes, and segregations are most frequent. The rolling is done with a circular rotation so that the fibrous structure of the ring or link is continuous throughout the whole ring but particularly at the ends, thereby strengthening such normally weak parts. In other words, the fibrous structure is oriented to follow the link and is internal thereto.

In use the elevator links may be assembled in pairs and each pair associated with a suitable collar or the like, the usual lifting hook device passing under the upper ends of the assembled links for the necessary raising or lowering operations in connection with oil or gas well practice.

Such variations and modifications may be made in the process or the link as will adapt the same to any particular set of conditions or apparatus encountered in practice and all such variations and modifications fall within the spirit and scope of the present invention. Some of these modifications and variations, for example, may consist in the composition of the metal of the link, in the pressure and/or heat exerted thereon and in the conformation of the mandrels which shape the link to desired form.

What I claim as new and desire to secure by Letters Patent is:

1. The method of manufacturing weldless elevator links including the steps of slicing a steel ingot into sections forming starting pieces for the links, upsetting and punching said sections, forming said upset sections into ring formation, elongating said ring formation, shaping said elongated rings into links and shaping said links into finished form.

2. The method of manufacturing weldless elevator links including the steps of slicing a steel ingot into sections, upsetting and punching said sections, forming said sections into rectangular walled rings, elongating said rings, forging said rings into links having a circular cross-section and shaping said so-forged links into final form.

3. The method of manufacturing weldless elevator links including the steps of slicing an ingot into sections, upsetting and punching said sections, rolling said sections into rectangular walled rings, elongating said rings, shaping said elongated rings into general link formation, providing said links by forging with a circular cross-section and a spacer tongue, and finally shaping said links into finished form.

4. The method of manufacturing weldless elevator links including the steps of slicing a steel ingot into sections forming starting pieces, upsetting and punching said starting pieces, rolling said upset and punched pieces into rectangular walled rings, stretching said rings into semi-oval form, shaping said semi-oval rings into a general link form, providing said links by drop forging with a circular cross-section and a spacer tongue and shaping said so-formed links into final form between a fixed mandrel and a die.

5. The method of manufacturing weldless elevator links including the steps of preparing disk-shaped starting pieces, punching out the center of said starting pieces, rolling the same with a circular rotation to orient the fibrous structure to conform to the piece, elongating and finishing the pieces into said links while maintaining said fibrous structure continuous and running with the link portions.

In testimony whereof, I have hereunto subscribed my name this 31st day of May, 1930.

FERDINAND J. SPANG.